Patented Sept. 9, 1941

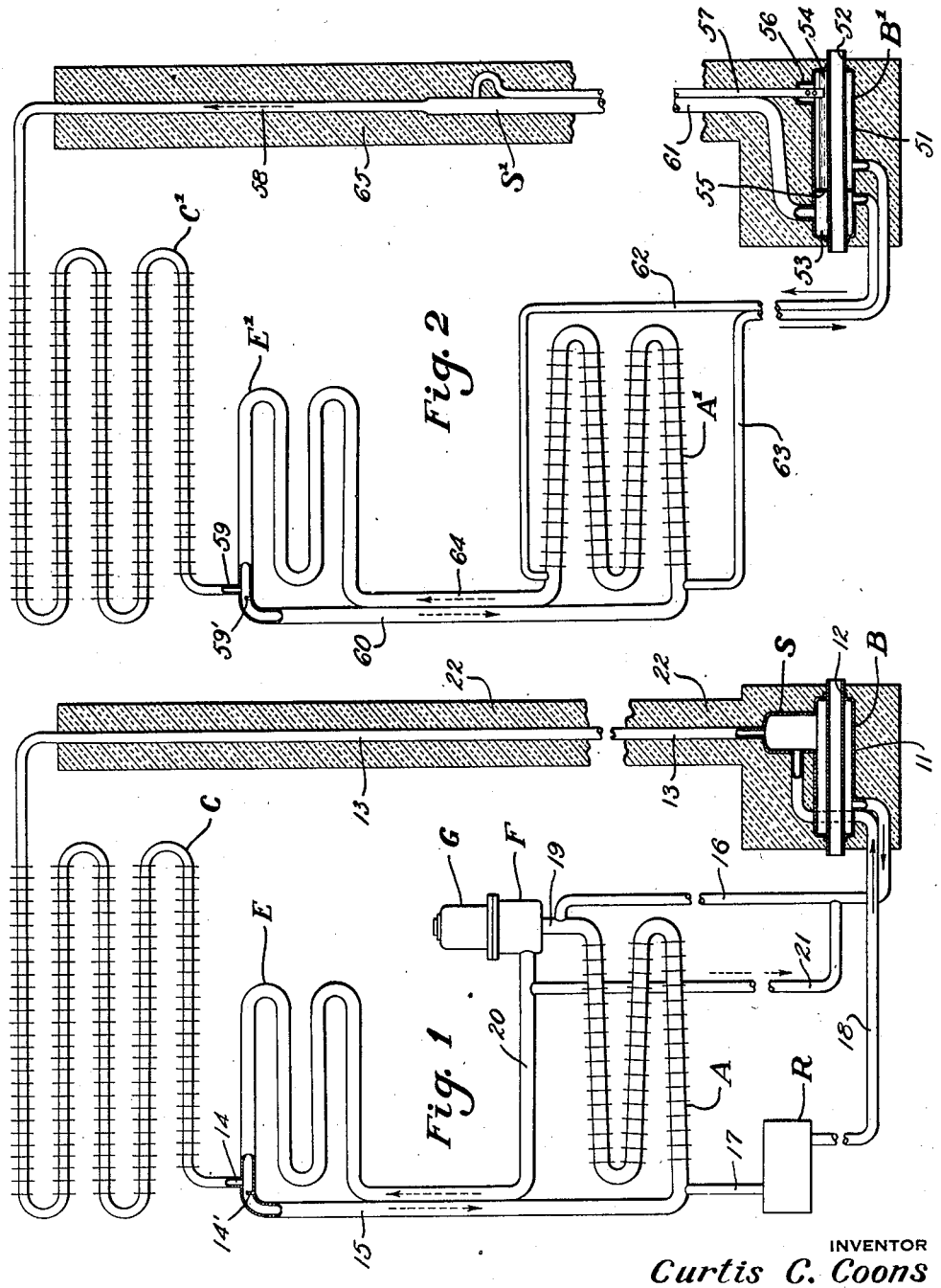

2,255,414

UNITED STATES PATENT OFFICE 2,255,414

REFRIGERATION

Curtis C. Coons, North Canton, Ohio, assignor to The Hoover Company, North Canton, Ohio, a corporation of Ohio Application August 30, 1937, Serial No. 161,564

7 Claims. (Cl. 62—119.5)

This invention relates to refrigerating systems using an inert gas as a pressure equalizing medium, a suitable substance for this purpose being hydrogen or nitrogen, a refrigerant, such as ammonia, and an absorbent for the refrigerant, such as lithium nitrate, zinc chloride, calcium nitrate or other metal salts possessing similar properties. These metal salts possess the great advantage that their vapor tension is negligible at the pressures and temperatures encountered in three fluid continuous absorption refrigerating systems. This dispenses with the necessity for an analyzer or a rectifier and permits certain hot portions of the system and various hot connections to be heavily insulated to prevent heat wastage. These substances also have a great affinity for ammonia vapor under the temperatures prevailing in an absorber of a continuous three fluid absorption refrigerating system whereby efficient absorption is promoted which of course results in efficient operation of the system as a whole.

The patents to Koenemann 1,982,672 issued December 4, 1934 and the patent to Rexwinkle 2,003,310 issued June 4, 1935 disclose refrigeration systems utilizing metal salts as absorbents. However, these patents disclose complex commercial systems utilizing various pump and valve structures which render their use in small installations costly and undesirable. The patents mentioned do not propose systems utilizing an inert pressure equalizing medium in the evaporator, and they do not disclose the various advantageous structures and methods which are possible when a pressure equalizing medium is used in conjunction with metal salt absorbents.

In general, I prefer to apply heat to a solution of refrigerant, such as ammonia, and a suitable metal salt, such as lithium nitrate, to generate refrigerant vapor. The refrigerant vapor is condensed to liquid phase in any suitable manner as by bringing it in heat exchange relationship with ambient air. The liquefied refrigerant is vaporized to produce refrigeration by conducting it into the presence of an inert pressure equalizing medium such as nitrogen or hydrogen. The refrigerant vapor is re-absorbed by contacting the refrigerant vapor and pressure equalizing medium mixture discharged from the evaporator with an extended surface of metal salt solution whereupon the strength of the solution is increased and it is returned to the zone of heat application to generate refrigerant vapor for further refrigeration.

It will be noted that the system just described includes neither an analyzer nor a rectifier. This is possible because of the fact that the absorbent has a negligible vapor tension at the pressures and temperatures prevailing in the system. Since it is unnecessary to reject heat between the boiler and condenser to eliminate absorbent vapor mixed with the refrigerant vapor, the boiler and the connections to the condenser can be insulated in order to maintain them at a high temperature and to prevent losses at these points.

The efficiency of this system is very great as compared with conventional ammonia water systems. There is no material heat loss from the boiler, liquid heat exchanger, and the connections to the condenser due to the fact that they are heavily insulated. In the conventional absorption refrigerating system part of the absorbent is vaporized in the boiler; this absorbent vapor is condensed in an analyzer and a rectifier and returned to the boiler. Also some refrigerant vapor is condensed in the analyzer-rectifier system and is returned to the boiler. The condensation of these vapors results in a direct loss of the heat supplied to generate them. In the present invention all vapors generated in the boiler are utilized to produce useful refrigeration, and all heat supplied to the boiler is utilized to produce vapor which subsequently produces refrigeration.

The low vapor tension and high affinity for the refrigerant characteristic of the absorbent utilized also provides efficient absorption due to the fact that the heat of absorption does not generate vapor of absorption solution whereby to decrease the relative concentration of refrigerant vapor in contact with the absorbing liquid as in the conventional ammonia water system.

The cumulative results of these features produce a system having a high efficiency and allow considerable simplification of the apparatus due to the fact that the analyzer and rectifier can be eliminated entirely from the system and are replaced by a mere conduit which may be completely insulated to prevent heat loss.

Accordingly, it is an object of this invention to provide a refrigerating system utilizing an absorbent which possesses a negligible vapor tension at the temperatures and pressures prevailing in the boiler of the system.

It is a further object of this invention to provide a refrigerating system in which an analyzer and a rectifier are unnecessary.

It is a further object of this invention to provide an absorption refrigerating system wherein the absorbent has a great affinity for the refrigerant.

It is a further object of my invention to provide a refrigerating system which is characterized by an extremely high thermal efficiency and a minimum of wasted heat.

It is a further object of the invention to provide a refrigerating system in which the boiler and all connections between the boiler and condenser are insulated.

It is a further object of the invention to provide a refrigerating system in which all vapor produced in the boiler is utilized to produce refrigeration.

It is a further object of this invention to provide a group of cooperating substances for refrigerating systems which possess marked advantages over previously known groups of substances.

Other objects reside in certain novel features which will be apparent from the following description taken in connection with the accompanying drawing, in which:

Fig. 1 is a diagrammatic view illustrating an absorption refrigerating system of the type utilizing a power driven device to circulate fluids therein.

Fig. 2 is a diagrammatic illustration of a continuous absorption refrigerating system wherein all fluids are circulated by factors within the system.

Referring now to Fig. 1 of the drawing it will be seen that I have disclosed a continuous three fluid absorption refrigeration system comprising a boiler B, a vapor dome S, a condenser C, an evaporator E, an absorber A, an inert gas circulating fan F driven by a motor G, and a liquid receiver R suitably connected by various conduits to form a complete system.

The boiler B comprises an elongated cylindrical vessel 11 having a combustion tube 12 extending therethrough. Heat is supplied to the combustion tube 12 in any suitable manner as by a gas burner or an electric cartridge heater. The heat applied to the boiler B vaporizes ammonia from an ammonia salt solution, such as ammonia-lithium nitrate, contained therein. The ammonia vapor separates from the solution and collects in the dome S. The ammonia vapor leaves the dome S by way of a conduit 13 which conducts it to the condenser C, which is preferably of the finned tube air cooled type, wherein it is liquefied. Liquid refrigerant is discharged from the condenser C through a conduit 14 into the evaporator E adjacent the dam 14'.

The liquid ammonia flows downwardly through the evaporator E in counter-current to a stream of inert pressure equalizing medium, such as nitrogen, and evaporates thereinto to produce refrigeration. The mixture of refrigerant vapor and pressure equalizing medium formed in the evaporator is discharged from the evaporator through a conduit 15 into the lower end of an absorber A, which is preferably of the air-cooled finned tube continuous type, where it is contacted with a lean solution of ammonia and a metal salt, such as lithium nitrate, in order that the ammonia may be separated from the inert pressure equalizing medium by absorption.

Lean solution formed in the boiler B discharges therefrom through a conduit 16 into the upper end of the absorber A through which it flows in counter-flow to the mixture of refrigerant vapor and pressure equalizing medium. The absorber may be internally baffled in any desired manner and is preferably of the finned tube air cooled type. The strong solution formed in the absorber discharges from the lower end thereof through a conduit 17 into the liquid receiver R. The strong solution is conveyed from the liquid receiver R to the steam dome by means of a conduit 18 which is in heat exchange relationship with the conduit 16 previously described. It will be understood that the conduits 16 and 18 will be suitably related to form a liquid heat exchanger.

The pressure equalizing medium purified in the absorber A exits therefrom through a conduit 19 into the suction inlet of the circulating fan F. The pressure equalizing medium is discharged under pressure from the fan F through a conduit 20 which is in heat exchange relationship with the conduit 15 previously described. It will be understood that the conduits 15 and 20 may be suitably formed to form a gas heat exchanger or may include a gas heat exchanger.

The absorption solution is elevated from the boiler to the absorber by means of a gas lift pump which comprises a conduit 21 connecting the pressure side of the circulating fan F to the weak liquor conduit 16 at a level below the liquid level in the boiler vapor dome system B—S.

As illustrated, the boiler B, steam dome S, the conduit 13, and the heat exchange portions of the conduits 16 and 18 are encased in a single block of insulating material 22. Obviously several distinct blocks of insulating material may be utilized to encase these members if desired.

With the system just described, the circulation of the fluids in the system is positive and may be controlled in any suitable manner, as by simultaneously controlling the supply of gas to the boiler and the supply of electricity to the motor 6.

Referring now to Fig. 2 it will be seen that I have illustrated a three fluid continuous absorption refrigerating system of the type operated by heat alone in which circulation of the fluid is produced entirely by factors within the system.

The system illustrated in Fig. 2 comprises a boiler $B^1$, a separation chamber $S^1$, a condenser $C^1$, an evaporator $E^1$, and an absorber $A^1$. These elements are suitably connected by various conduits to form a continuous three fluid absorption refrigerating system.

The boiler $B^1$ comprises an elongated cylindrical vessel 51 which is traversed by a combustion tube 52. The boiler $B^1$ is internally divided into a heating chamber 53 and a pumping chamber 54 by means of the transverse partition 55. Heat is applied to the combustion tube 52 in any suitable manner as by a gas burner or an electric cartridge heater. The heat applied to the boiler $B^1$ heats the solution therein contained and liberates vaporous refrigerant therefrom. Preferably this solution comprises ammonia and a metal salt having a high affinity for ammonia and a very low vapor tension, such as lithium nitrate.

Vapor liberated in the pumping chamber 54 from the strong solution therein contained tends to collect in the steam dome 56 and operates a vapor lift pump conduit 57 which extends slightly into the liquid in the chamber 54 and discharges in the separation chamber $S^1$. The vapor lift pump 57 forces a stream consisting of alternate slugs of liquid absorbent and refrigerant vapor upwardly through the conduit 57 into the separation chamber $S^1$ wherein the slugs separate and continue through their respective circuits in a manner to be herein described.

The refrigerant vapor which separates from the weak solution in chamber S¹ discharges therefrom through a conduit 58 which leads to a condenser C¹ preferably of the continuous finned tube air cooled type. The refrigerant vapor is liquefied in the condenser C¹ and is discharged therefrom into the evaporator E through a conduit 59 adjacent the dam 59'.

In the evaporator E¹ the liquid refrigerant flows downwardly in counter-current to a pressure equalizing medium, such as hydrogen, and evaporates thereinto to produce refrigeration. The mixture of inert pressure equalizing medium and vaporized refrigerant formed in the evaporator discharges therefrom through a gas conduit 60 which leads to the lowest portion of the absorber A¹. The vapor gas mixture travels upwardly through the absorber A¹ in counter-current to a thin continuous stream of weak absorption liquid whereby the pressure equalizing medium is freed of refrigerant vapor by absorption in the absorbent solution. The absorber A¹ is preferably of the air-cooled continuous tube type and may be internally baffled in any desired manner.

The weak solution discharged into the separation chamber S¹ flows downwardly through a large conduit 61 into the boiler heating chamber 53 where it is subjected to a relatively intense heat and liberates a further quantity of refrigerant vapor which bubbles upwardly through the conduit 61 into the separation chamber S¹. Weak solution is conveyed from the chamber 53 to the upper portion of the absorber A¹ by means of the conduit 62. It will be noted that the conduit 62 discharges into the absorber A¹ below the level of the point of discharge of the conduit 57 into the chamber S¹ whereby the circulation of the absorption liquid from the chamber S¹ to the absorber A¹ is under the influence of gravity. The strong absorption solution formed in the absorber A¹ discharges from the lower end thereof through a conduit 63 which is in heat exchange relationship with the weak liquor conduit 62 previously described. The strong liquor conduit 63 discharges into the boiler pumping chamber 54. It will be understood, of course, that the conduits 62 and 63 may be related in any suitable manner to form an efficient liquid heat exchanger.

The inert pressure equalizing medium which is freed of refrigerant vapor in the absorber A¹ is returned to the evaporator by a conduit 64 which is in heat exchange relationship with the conduit 60 previously described. It will be understood that conduits 60 and 64 may be related in any suitable manner to form a gas heat exchanger.

In this system the circulation of the absorption liquid is achieved by means of the vapor lift pump 57 from the discharge end of which the liquid circulates through the system entirely by gravity. The inert gas circuit circulation is also a gravity type; the gas circulates due to the density differential between the cold rich gas descending in the conduit 60 and the warm lean gas ascending in the conduit 64. It will be understood, of course, that the temperature difference between these two columns of gas will produce a flow in the direction indicated by the dotted arrows; also the gas in the conduit 60 at any given pressure and temperature is much denser than the gas in the conduit 64 at the same pressure and temperature due to the fact that the percentage of ammonia in the gas in the conduit 60 is very much greater than that in the conduit 64.

In order to promote the heat efficiency of the refrigerating system as a whole, the conduit 58, the boiler vapor lift pump assembly, and the liquid heat exchanger assembly is encased in insulating material 65 as illustrated. Of course, separate blocks of insulation could be used to insulate these various elements if necessary, or desirable.

It will be seen that each of the refrigerating systems disclosed operates without an analyzer or a rectifier and is so constructed that all the heat supplied to the boiler is utilized solely to generate refrigerant vapor which is later utilized in producing useful refrigeration.

Although I have explained in detail the operation of my system with respect to a particular type of absorbent, I do not intend that the scope of my invention shall be limited by this description except insofar as required by the scope of the following claims. As an absorbent I may employ any substances which have properties similar to those specifically mentioned herein.

I claim:
1. A group of cooperating substances used in a refrigerating system comprising ammonia, nitrogen, and lithium nitrate.

2. That improvement in the art of refrigeration which includes the steps of generating substantially pure refrigerant vapor by applying heat to a solution of refrigerant and an absorbent having a negligible vapor pressure at temperature and pressure conditions under which vapor of the refrigerant will be expelled from the absorbent, conducting said refrigerant vapor to a liquefying zone without affecting the temperature or total heat of said vapor, liquefying the vapor so produced, evaporating the liquid in the presence of an inert pressure equalizing medium, and freeing the pressure equalizing medium of refrigerant vapor by contacting the mixture with a weak solution of said refrigerant with said absorbent.

3. That method of producing refrigeration which includes the steps of applying heat to a solution of ammonia and lithium nitrate in a heating zone to produce ammonia vapor, conducting the ammonia vapor to a liquefying zone in a substantially constant thermal condition, liquefying the ammonia vapor, evaporating the liquid ammonia into a propelled stream of nitrogen, separating the nitrogen and refrigerant vapor by causing the mixture to flow in contact with a body of lithium nitrate and returning the resulting solution to said heating zone.

4. That method of producing refrigeration which includes the steps of applying heat to a solution of ammonia and lithium nitrate to generate ammonia vapor therefrom, liquefying the vapor so produced by passing cooling air in heat transfer relation therewith, evaporating the liquid ammonia into a propelled stream of inert gas to produce a cooling effect, absorbing ammonia vapor from the inert gas by contacting the same with ammonia-lithium nitrate solution previously weakened by the generation of ammonia vapor therefrom, and conveying the ammonia-lithium nitrate solution into contact with the inert gas ammonia vapor mixture by gas lift action by introducing a small quantity of inert gas into the ammonia-lithium nitrate solution.

5. An absorption refrigerating system comprising a generator containing an ammonia-lithium nitrate solution, a condenser, means for conveying ammonia vapor liberated in said generator to said condenser, an evaporator and an absorber connected to form a gas circuit, means for circulating nitrogen through said gas circuit, means for supplying ammonia liquid from said condenser to said evaporator, a gas lift pump connected to convey weak ammonia-lithium nitrate solution from said generator to said absorber, means for introducing nitrogen into said gas lift pump to operate the same, and means for conveying rich ammonia-lithium nitrate solution from said absorber to said generator.

6. That improvement in the art of absorption refrigeration which includes the steps of generating ammonia vapor from an ammonia-lithium nitrate solution in a generating zone, liquefying the ammonia vapor so produced by heat exchange with air, evaporating the liquefied ammonia into a propelled stream of nitrogen gas, absorbing ammonia from the ammonia nitrogen mixture by contact with a weak ammonia-lithium nitrate solution in an absorbing zone, and circulating ammonia-lithium nitrate between the generating and absorbing zones by introducing nitrogen gas into a rising body of the ammonia-lithium nitrate solution.

7. An absorption refrigerating system comprising a generator containing a solution of a refrigerant in an absorbent having a negligible vapor pressure at the temperatures and pressures under which the refrigerant will be expelled from the solution, a condenser, means for conveying refrigerant vapor from said boiler to said condenser and for substantially preventing rejection of heat from the vapor enroute from said boiler to said condenser, an evaporator connected to receive refrigerant liquid from said condenser, an absorber, means for conducting refrigerant vapor from said evaporator to said absorber, and means for circulating solution between said absorber and said boiler.

CURTIS C. COONS.